US009596833B2

(12) United States Patent
Blough et al.

(10) Patent No.: US 9,596,833 B2
(45) Date of Patent: Mar. 21, 2017

(54) DOG EXERCISE APPARATUS AND METHOD OF USING

(71) Applicants: Janice M. Blough, Fenton, MI (US); Mark A. Blough, Fenton, MI (US)

(72) Inventors: Janice M. Blough, Fenton, MI (US); Mark A. Blough, Fenton, MI (US)

( * ) Notice: Subject to any disclaimer, the term of this patent is extended or adjusted under 35 U.S.C. 154(b) by 0 days.

(21) Appl. No.: 14/599,447

(22) Filed: Jan. 16, 2015

(65) Prior Publication Data
US 2015/0327515 A1    Nov. 19, 2015

Related U.S. Application Data

(60) Provisional application No. 61/964,954, filed on Jan. 22, 2014.

(51) Int. Cl.
*A01K 15/02* (2006.01)
*A01K 27/00* (2006.01)
*A01K 29/00* (2006.01)
*A01K 1/04* (2006.01)

(52) U.S. Cl.
CPC .............. *A01K 27/003* (2013.01); *A01K 1/04* (2013.01); *A01K 15/027* (2013.01); *A01K 29/00* (2013.01)

(58) Field of Classification Search
CPC .. A01K 15/027; A01K 27/003; A01K 27/002; A01K 29/00
USPC ......................................................... 119/771
See application file for complete search history.

(56) References Cited

U.S. PATENT DOCUMENTS

| | | | | |
|---|---|---|---|---|
| 4,134,364 A | * | 1/1979 | Boncela | A01K 1/04 119/703 |
| 4,159,142 A | * | 6/1979 | Larson | A01K 5/0107 119/408 |
| 5,033,409 A | * | 7/1991 | Sabot | A01K 15/027 119/703 |
| 5,215,037 A | * | 6/1993 | Allred | A01K 27/00 119/771 |
| 5,375,561 A | * | 12/1994 | Gundersen | A01K 27/003 119/771 |
| 5,632,233 A | * | 5/1997 | Kovach | A01K 1/04 119/771 |
| 5,775,264 A | * | 7/1998 | Dixon | A01K 1/04 119/771 |
| 5,842,445 A | * | 12/1998 | Barbour | A01K 27/003 119/771 |
| 6,142,103 A | * | 11/2000 | Meyers | B60P 3/04 119/771 |

(Continued)

*Primary Examiner* — Monica Williams
*Assistant Examiner* — Michael A Fabula

(57) ABSTRACT

An apparatus for exercising a dog and a method of using the apparatus is described. The apparatus comprises a first elongated member having inner and outer ends with the inner end being fastened to a vehicle in a first location; a second elongated member having upper and lower ends with the upper end fastened to the vehicle in a second location; and a means of attaching the outer end of the first member and the lower end of the second member to a fastener device that contacts the dog, such that the first and second members establish an angle φ of separation between themselves that is within the range of about 15° to 75°. The first and second members are fastened to the vehicle such that angles σ and β, are formed between the vehicle and the members with at least one of the angles between about 15° to 165°.

15 Claims, 4 Drawing Sheets

(56) References Cited

U.S. PATENT DOCUMENTS

| | | | | |
|---|---|---|---|---|
| 6,148,772 | A * | 11/2000 | Keyek-Frannsen | A01K 1/04 119/771 |
| 6,408,793 | B1 * | 6/2002 | Rutter | B60P 3/04 119/400 |
| 6,662,751 | B1 * | 12/2003 | Rutter | B60P 3/04 119/400 |
| 6,874,448 | B1 * | 4/2005 | Fleck | A01K 1/04 119/771 |
| D601,067 | S * | 9/2009 | Forrest | D12/186 |
| D637,126 | S * | 5/2011 | Forrest | D12/186 |
| 8,955,464 | B2 * | 2/2015 | Lytle, Jr. | A01K 27/004 119/771 |
| 2005/0005876 | A1 * | 1/2005 | Calvi | A01K 27/003 119/771 |
| 2005/0022752 | A1 * | 2/2005 | Leon | A01K 27/003 119/771 |
| 2005/0034685 | A1 * | 2/2005 | Chen | A01K 27/003 119/771 |
| 2009/0139463 | A1 * | 6/2009 | Morrow | A01K 1/04 119/771 |
| 2009/0188441 | A1 * | 7/2009 | Tollman | A01K 27/003 119/771 |
| 2009/0229536 | A1 * | 9/2009 | Chen | A01K 1/0281 119/771 |
| 2011/0181423 | A1 * | 7/2011 | Lytle, Jr. | A01K 27/004 340/573.3 |
| 2011/0277699 | A1 * | 11/2011 | McCarthy | A01K 1/04 119/771 |
| 2012/0118245 | A1 * | 5/2012 | Leon | A01K 27/003 119/771 |
| 2014/0283759 | A1 * | 9/2014 | Bianchi | A01K 1/04 119/771 |

* cited by examiner

DOG EXERCISE APPARATUS AND METHOD OF USING

CROSS-REFERENCE TO RELATED APPLICATIONS

This application claims the benefit of provisional application Ser. No. 61/964,954, filed on Jan. 22, 2014. The disclosure of the above application is incorporated herein by reference in its entirety.

FIELD

This disclosure relates generally to a dog exercising device and a method of using said device. More specifically, this disclosure relates to an apparatus for exercising a dog while riding a bicycle, a wheel-chair, a tricycle, or the like.

BACKGROUND

The statements in this section merely provide background information related to the present disclosure and may not constitute prior art.

Dogs are normally exercised by a person walking or running with the dog on a leash. However, a more rigorous workout for both the person and the dog is possible when the person rides a bicycle. However, tying the leash to the bicycle or holding the leash in one hand while riding a bicycle can create a dangerous and unstable condition.

Prior attempts to create a suitable dog exercising device for use with a bicycle have resulted in devices mounted to the bicycle in positions that can permit the dog to upset the balance of the bicycle, thereby, impeding steering or even causing the cyclist to lose control of the bicycle. Such an occurrence may lead to serious injury for the cyclist, the dog, or both.

SUMMARY

In overcoming the enumerated drawbacks and other limitations of the related art, the present disclosure provides an apparatus for exercising a dog while riding a personal transport vehicle having a frame, a seat, and at least two wheels. This apparatus generally comprises: a first elongated member having an inner and outer end, the inner end mechanically fastened to the personal transport vehicle in a first location (I); a second elongated member having an upper and lower end; the upper end mechanically fastened to the personal transport vehicle in a second location (II); and a means of attaching the outer end of the first elongated member and the lower end of the second elongated member to a fastener device that is in contact with the dog, such that the first elongated member and the second elongated member establish an angle φ of separation between themselves that is within the range of about 15° to about 75°. Alternatively, the angle φ between the first and second elongated members is between about 30° to about 60°.

According to one aspect of the present disclosure, the first elongated member makes an angle σ with the frame and the second elongated member makes an angle β with the frame, such that at least one of angles σ or β is between about 15° to about 165°. Alternatively, at least one of the angles σ or β is between about 30° to about 150°.

According to another aspect of the present disclosure, the first location (I) of the personal transport vehicle is approximate the position at which the frame is coupled to one of the wheels and the second location (II) is approximate the position at which the seat is coupled to the frame. The personal transport vehicle may be a bicycle, a tricycle, or a wheelchair. Alternatively, the personal vehicle is a bicycle and the wheel is the rear wheel.

The first and second elongated members are independently selected to be a hollow rod, a hollow bar, a solid rod, or a solid bar. Each rod or bar is independently selected to comprise a metal, a metal alloy, a reinforced polymer material or composite, a thermoplastic or a combination thereof.

The fastener device is further described as a collar, halter, jacket, or harness worn by the dog. Optionally, the apparatus may further comprise a leash that is coupled to at least one of the lower end of the first member or the outer end of the second member and the fastener in contact with the dog. In this case, the second member of the apparatus has a first length, $L_1$, and the leash has a second length, $L_2$, wherein the length, $L_1$ is greater than the length, $L_2$.

According to yet another aspect of the present disclosure at least one of the first member and second member are mechanically fastened such that the member can pivot provided that the corresponding angle σ or β is between about 15° to about 165°. The first and second member may be mechanically fastened using a bracket, a clamp, a hinge, a bolt/nut, a pin, or any other means known to one skilled in the art. The length, $L_2$, is at least 25.4 cm (10 inches), alternatively, at least 50.8 cm (20 inches).

According to another aspect of the present disclosure, a method of exercising a dog is provided. In general, this method comprises the steps of providing a personal transport vehicle equipped with an exercise apparatus constructed as previously described above and further described herein, providing a dog in contact with a fastener device, attaching the fastener device to the exercise apparatus, and causing the personal vehicle and dog to move.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
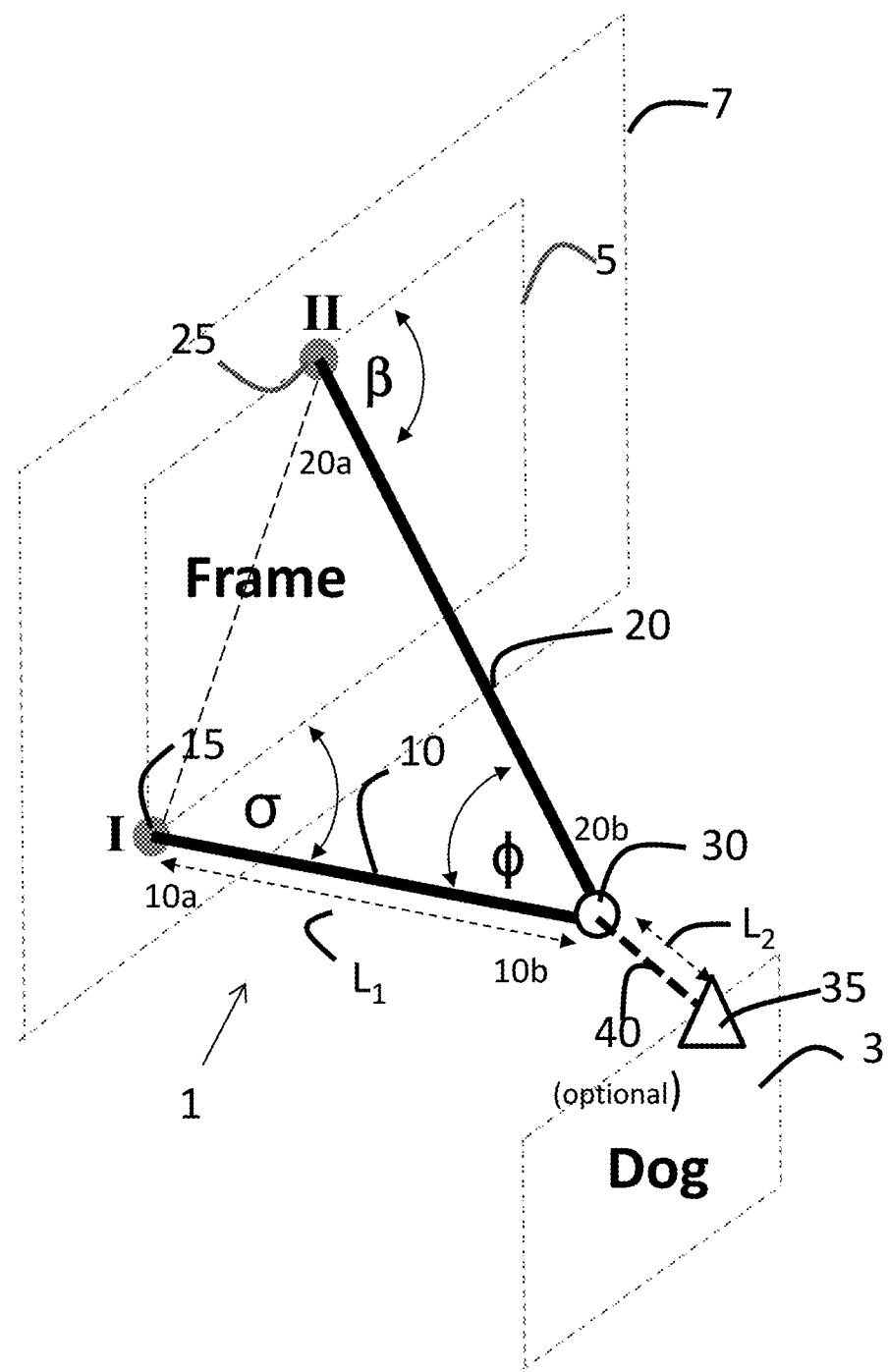
FIG. 1 is a schematic representation of an apparatus for use in exercising a dog while riding a personal transport vehicle constructed according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure generally relates to a dog exercise apparatus for use with a personal transport vehicle. The exercise apparatus made and used according to the teachings contained herein is described throughout the present disclosure in conjunction with a bicycle in order to more fully illustrate the concept. The incorporation and use of the exercise apparatus in conjunction with other types of personal transport vehicles, including but not limited to tricycles and wheelchairs, is contemplated to be within the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

Referring to FIG. 1, the exercise apparatus 1 generally comprises a first elongated member 10, a second elongated member 20, and a means 15, 25, 30 for attaching the first and second elongated members 10, 20 to the frame 5 of a personal transport vehicle 7 and to a fastener device 35 that is in contact with the dog 3. The first elongated member 10 has an inner end 10a and an outer end 10b, wherein the inner end 10a is mechanically fastened 15 to the frame 5 of the personal transport vehicle 7 in a first location (I). Similarly, the second elongated member 20 has an upper end 20a and a lower end 20b, wherein the upper end 20a is mechanically fastened to the frame 5 of the personal transport vehicle 7 in a second location (II). The outer end 10b of the first member 10 and the lower end 20b of the second member 20 are approximate one another and are coupled by a fastening means 30 to a fastener device 35 that is in contact with the dog 3.

The means 30 of attaching the outer end 10b of the first elongated member 10 and the lower end 20b of the second elongated member 20 to the fastener device 35 that is in contact with the dog 3 results in the outer end 10b and the lower end 20b intersecting and establishing an angle $\phi$ of separation between the first member 10 and second member 20 that is within the range of about 15° to about 75°, alternatively, between about 30° to about 60°. The means 30 of attaching the first elongated member 10 and second elongated member 20 to the fastener device 35 may involve any fastening mechanism or assembly known to one skilled in the art, including but not limited to, hooks, clips, clamps, catches, clasps, locks, latches, ringlets, or any combination thereof.

The fastener device 35 may include any type of a collar, halter, jacket, choker, or harness worn by the dog 3. The fastener device 35 may be made of leather, rope, cord, synthetic polymer, or woven material, to name a few. The fastener device 35 may be worn around the neck or chest of the dog 3. Optionally, the outer end 10b and lower end 20b of the first 10 and second 20 members, respectively, may be coupled to one end of a leash 40 with the other end of the leash 40 being coupled to the fastener device 35. The leash 40 is further defined to have a length ($L_2$) that is shorter than the length ($L_1$) of the first elongated member 10 in order to ensure that the dog cannot get tangled up with the wheels of the personal transport vehicle 7 or cross the plane established by the frame 5 of the personal transport vehicle 7 in front of, behind, or between the wheels, thereby, causing an unstable condition for either the vehicle 7, the dog 3, or both. Typically, the length ($L_1$) of the first elongated member 10 is at least 25.4 cm (10 inches), alternatively, at least 50.8 cm (20 inches). The length ($L_1$) of the first elongated member 10 may be varied in order to space the dog 3 farther from the vehicle 7. The maximum length ($L_1$) of the first elongated member 10 is determined by the weight of the member and the desired distance between the dog 3 and the vehicle 7, alternatively, the length ($L_1$) is less than about 304.8 cm (10 feet), alternatively less than about 152.4 cm (5 feet).

Still referring to FIG. 1, the means 15 of attaching the inner end 10a of first elongated member 10 to the frame 5 of the personal transport vehicle 7 may be the same or different than the means 25 of attaching the upper end 20a of the second elongated member 20 to the frame 5 of the personal transport vehicle 7. In other words, the means 15, 25 of connecting the members to the frame 5 may be any fastening mechanism or assembly that is independently selected by one skilled in the art. Several specific examples of such fastening mechanisms include without limitation, a combination of brackets, clamps, latches, hinges, bolts/nuts, pins, or screws. The selected means 15, 25 may securely fasten the first 10 and second 20 members to the frame 5, such that the first elongated member 10 makes an angle $\sigma$ with the frame 5 and the second elongated member 20 makes an angle $\beta$ with the frame 5. At least one of the angles $\sigma$ or $\beta$ is between about 15° to about 165°, alternatively, between about 30° to about 150°. When desirable, both angles $\sigma$ and $\beta$ are between about 15° to about 165°. In FIG. 1, the angles $\alpha$ and $\beta$ are shown to be about 90° or greater.

The selected means 15, 25 of fastening the first 10 and second 20 elongated members to the frame 5 of the personal transport vehicle 7 may allow the first 10 member, the second 20 member or both members to pivot at the corresponding first (I) and second (II) locations. However, such pivot action is allowable provided that the angle $\sigma$ or $\beta$ is maintained between about 15° to about 165°, alternatively, about 30° to about 150°. The angle $\sigma$ or $\beta$ is maintained within this range in order to ensure that the dog cannot cross the plane of the personal transport vehicle 7, thereby, causing an unstable condition for either the vehicle 7, dog 3, or both.

Figure 2:
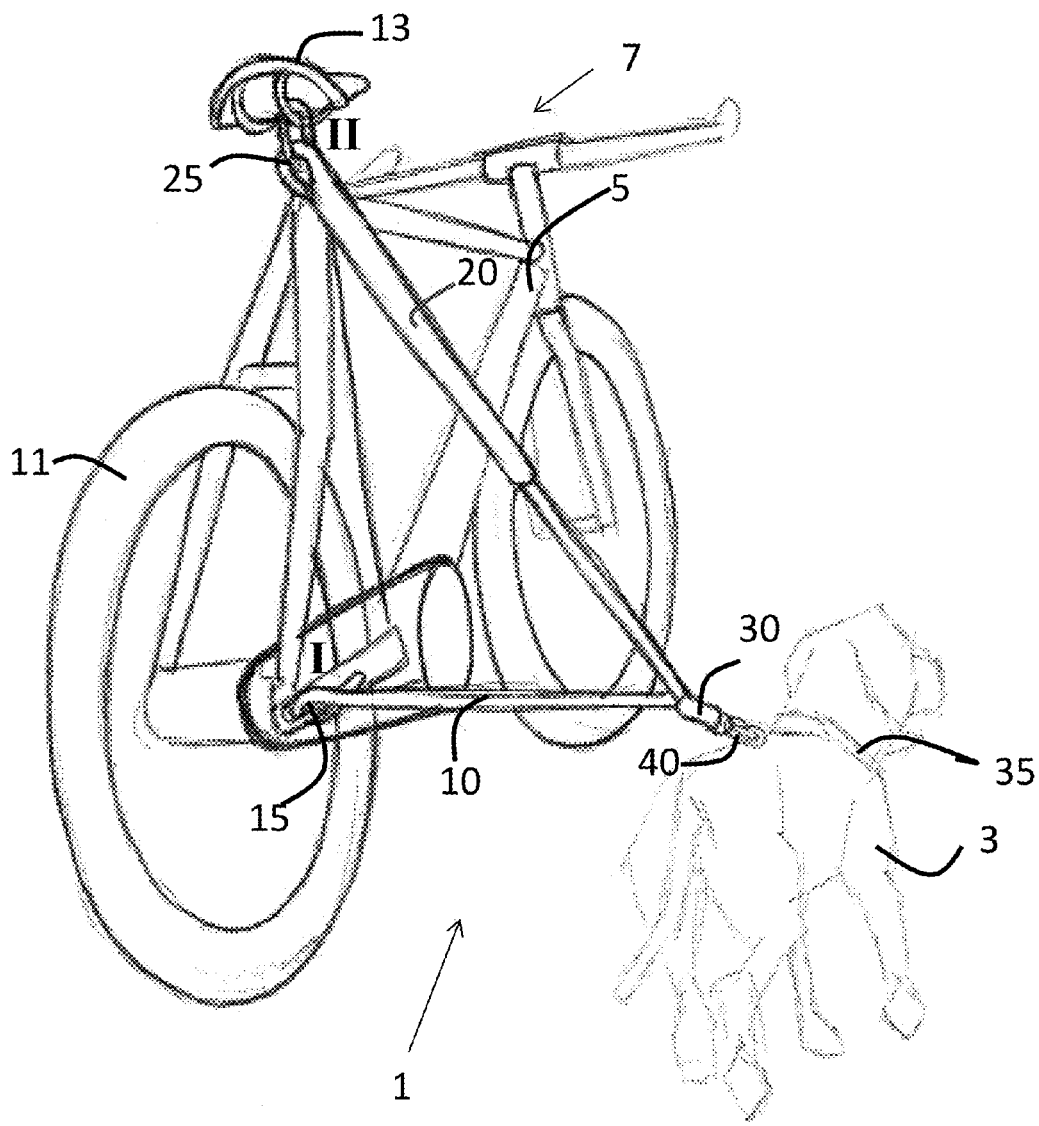
FIG. 2 is a perspective view of a dog being exercised according to the teachings of the present disclosure, illustrated when the apparatus is mounted to a bicycle.

Referring now to FIG. 2, the first location (I) of the personal transport vehicle 7 is approximate the position at which the frame 5 is coupled to one of the wheels 11 and the second location (II) is approximate the position at which the seat 13 is coupled to the frame 5. One skilled in the art will understand that the position at which the seat 13 couples to the frame 5 is approximately located near the seat post and adjacent to the seat rails. Similarly, the position that the wheel 11 couples to the frame 5 is approximately located near the rear derailleur. According to one aspect of the present disclosure, the personal transport vehicle 7 is a bicycle and the wheel 11 is the rear wheel. The first elongated member 10 is adapted to be attached to the rear frame 5 of the bicycle 7, near the mounting position of the rear wheel 11. This relatively low mounting position (I) for the first elongated member 10 relative to the mounting position (II) for the second elongated member 20 is important because by lowering the position at which the dog 3 is connected to the bicycle 7, the effective moment arm is decreased and the amount of force or pull necessary for the dog 3 to pull the bicycle 7 during use increases. While the apparatus 1 is shown as being mounted to the right side of the bicycle 7, one skilled in the art will understand that the apparatus 1 may easily be converted for mounting on the left side of the bicycle 7 without exceeding the scope of the present disclosure.

Figure 3A:
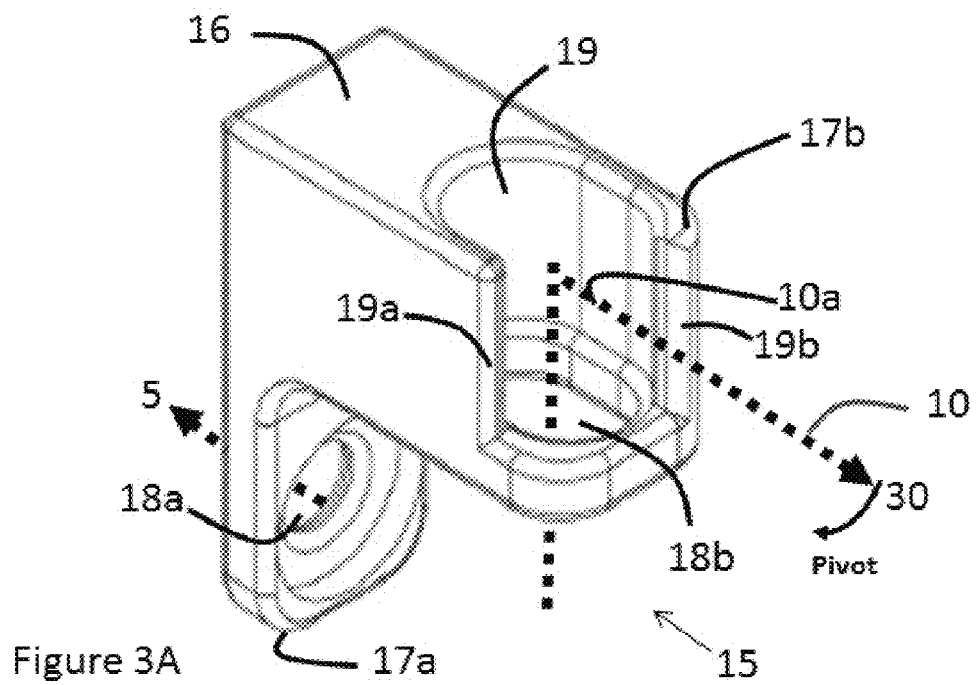
FIG. 3A is perspective view of an L-shaped bracket used to couple the apparatus to the frame of a bicycle.
Figure 3B:
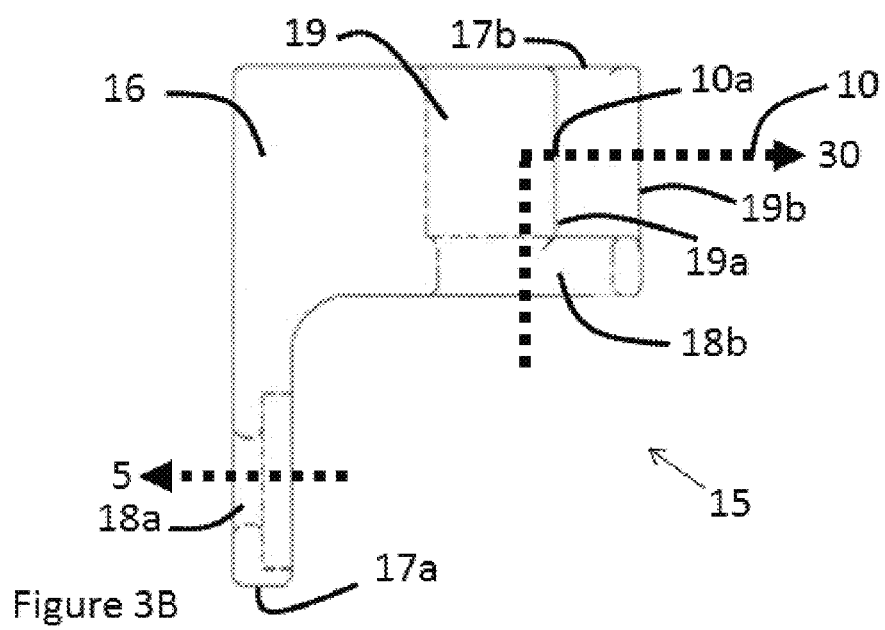
FIG. 3B is a cross-sectional view of the L-shaped bracket shown in FIG. 3A.

Referring now to FIGS. 3A and 3B, one specific example of a means 15 of attaching the inner end 10a of first elongated member 10 to the frame 5 of the personal transport vehicle includes an L-shaped bracket 16. One end 17a of the L-shaped bracket 16 is designed such that it can be coupled to the frame adjacent to where the wheel is attached to the frame 5. Alternatively, the end 17*a* may include an orifice 18*a* through which a bolt and nut may be used to couple the L-shaped bracket 16 to the frame 5. The second end 17*b* of the L-shaped bracket 16 may be coupled to the first elongated member 10. The second end 17*b* may include orifices 18*b*, 19 capable of receiving the first elongated member 10 of the exercise apparatus 1. The first elongated member 10 may include an inner end 10*a* that is L-shaped in order to be received by the orifices 18*b*, 19 in the second end 17*b* of the L-shaped bracket 16 and to allow the first elongated member 10 to pivot. The ability of the first elongated member 10 to pivot may be assisted by the design of the wall 19 surrounding the orifices 18*b*, 19 or absence thereof, i.e., the space between the ends of wall 19*a*,19*b*.

The first elongated member 10 and the second elongated member 20 are independently selected to be a hollow rod, a hollow bar, a solid rod, or a solid bar. Each rod or bar may be independently selected to be a resilient material that exhibits some flexibility in the lateral direction. However, each rod and bar has enough rigidity to ensure that one or more of the angles σ or β are maintained between about 15° to about 165°, alternatively, between about 30° to about 150°. By being flexible, the rods or bars assist in isolating the bicycle 7 from most forces caused by the sudden jerking or movement of the dog 3. Similarly, the dog 3 is also protected by any sudden or unexpected motions arising from the bicycle 7. The length and the diameter or thickness of each rod or bar can be varied to provide for greater or less flexibility depending upon the size or strength of the dog 3 and the result or effect desired by the operator of the bicycle 7. Several specific examples of materials from which the first 10 and second 20 elongated members may be made, include but are not limited to, metals, metal alloys, reinforced polymer materials, thermoplastics or combinations thereof. When desirable, the first member 10, second member 20, or both members may be of a tubular construction comprising a light weight metal, such as aluminum, or a fiber reinforced composite material.

Figure 4:
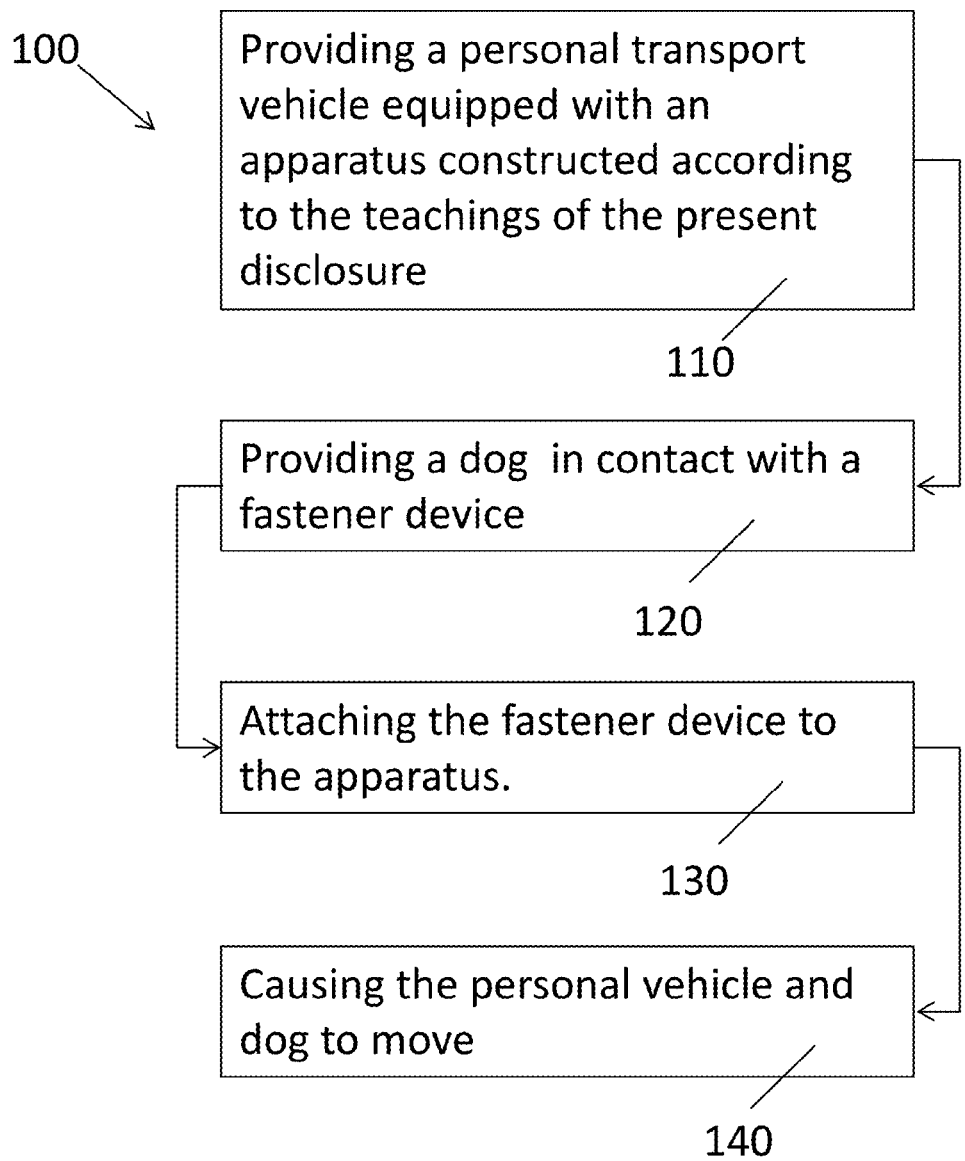
FIG. 4 is a schematic representation of a method of exercising a dog according to the teachings of the present disclosure.

Referring now to FIG. 4, a method 100 of exercising a dog is provided. This method 100 generally comprises the steps of providing a personal transport vehicle 110 that is equipped with an exercise apparatus constructed according to the teachings previously described above; providing a dog 120 in contact with a fastener device; attaching 130 the fastener device to the exercise apparatus; and causing the personal vehicle and dog to move 140.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for exercising a dog while riding a personal transport vehicle having a frame, a seat, and at least two wheels; the apparatus consisting of:

a first elongated member having an inner end and an outer end;

wherein the inner end is mechanically fastened to the personal transport vehicle at a first location (I), the first location (I) being approximate to a position at which the frame is coupled to one of the wheels, and the first elongated member is substantially horizontal with respect to the ground and makes a first angle (σ) with the frame;

a second elongated member having an upper end and a lower end;

wherein the upper end is mechanically fastened to the personal transport vehicle at a second location (II), the second location (II) being approximate to a position at which the seat is coupled to the frame, and the second elongated member is diagonal with respect to the first elongated member and makes a second angle (β) with the frame; and a fastening mechanism that attaches the outer end of the first elongated member and the lower end of the second elongated member to a fastener device that is in contact with the dog, such that the first elongated member and the second elongated member form a third angle (Φ) with respect to one another; and wherein at least one of the first elongated member and the second elongated member is configured to be pivotable about its respective mechanical fastening location towards at least one of the front and the rear of the vehicle.

2. The apparatus of claim 1, wherein the personal vehicle is a bicycle and the wheel is the rear wheel.

3. The apparatus of claim 1, wherein the first and second elongated members are independently selected to be a hollow rod, a hollow bar, a solid rod, or a solid bar.

4. The apparatus of claim 1, wherein the first and second elongated members are independently selected to comprise a metal, a metal alloy, a reinforced polymer material, a thermoplastic or a combination thereof.

5. The apparatus of claim 1, wherein the fastener device is a leash connectable to an article worn by a dog.

6. The apparatus of claim 5, wherein the second member has a first length ($L_1$) and the leash has a second length ($L_2$) wherein the length ($L_1$) of the second member is greater than the length ($L_2$) of the leash.

7. The apparatus of claim 6, wherein the second length ($L_2$) is at least 25.4 cm (10 in).

8. The apparatus of claim 1, wherein the fastener device is a collar, halter, jacket, choker, or harness worn by the dog.

9. The apparatus of claim 1, wherein at least one of the first member and the second member is mechanically fastened such that at least one of the first angle (σ) and the second angle (β) is maintained between about 15° to about 165° during pivoting of said at least one of the first and second members.

10. The apparatus of claim 1, wherein the first and second members are mechanically fastened using a bracket, a clamp, a hinge, a nut and bolt, a pin, or combination thereof.

11. A method of exercising a dog, the method comprising the steps of: providing a personal transport vehicle having a frame, a seat, and at least two wheels; providing an exercise apparatus;

wherein the exercise apparatus consists of:

a first elongated member having an inner end and an outer end;

wherein the inner end is mechanically fastened to the personal transport vehicle at a first location (I), the first location (I) being approximate to a position at which the frame is coupled to one of the wheels, and the first elongated member is substantially horizontal with respect to the ground and makes a first angle ($\sigma$) with the frame;

a second elongated member having an upper end and a lower end;

wherein the upper end is mechanically fastened to the personal transport vehicle at a second location (II), the second location (II) being approximate to a position at which the seat is coupled to the frame, and the second elongated member is diagonal with respect to the first elongated member and makes a second angle ($\beta$) with the frame; and a fastening mechanism that attaches the outer end of the first elongated member and the lower end of the second elongated member to a fastener device that is in contact with the dog, such that the first elongated member and the second elongated member form a third angle ($\Phi$) with respect to one another; and wherein at least one of the first elongated member and the second elongated member is configured to be pivotable about its respective mechanical fastening location towards at least one of the front and the rear of the vehicle; and equipping the exercise apparatus to the personal transport vehicle.

12. The method of claim 11, wherein the fastener device is a leash connectable to an article worn by a dog.

13. The method of claim 12, wherein the second member has a first length ($L_1$) and the leash has a second length ($L_2$) wherein the length ($L_1$) of the second member is greater than the length ($L_2$) of the leash.

14. The method of claim 11, wherein at least one of the first member and the second member is mechanically fastened such that at least one of the first angle ($\sigma$) and the second angle ($\beta$) is maintained between about 15° to about 165° during pivoting of said at least one of the first and second members.

15. The method of claim 11, wherein the first and second members are mechanically fastened using a bracket, a clamp, a hinge, a nut and bolt, a pin, or combination thereof.

* * * * *